US012715418B2

(12) United States Patent
Legner

(10) Patent No.: US 12,715,418 B2
(45) Date of Patent: Aug. 25, 2026

(54) METHOD FOR OPERATING AN ELECTRIFIED DRIVE TRAIN FOR A WORKING MACHINE, ELECTRIFIED DRIVE TRAIN FOR A WORKING MACHINE AND WORKING MACHINE

(71) Applicant: ZF Friedrichshafen AG, Friedrichshafen (DE)

(72) Inventor: Jürgen Legner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 216 days.

(21) Appl. No.: 18/574,371

(22) PCT Filed: Jun. 23, 2022

(86) PCT No.: PCT/EP2022/067171
§ 371 (c)(1),
(2) Date: Dec. 27, 2023

(87) PCT Pub. No.: WO2023/274836
PCT Pub. Date: Jan. 5, 2023

(65) Prior Publication Data

US 2024/0294162 A1 Sep. 5, 2024

(30) Foreign Application Priority Data

Jun. 28, 2021 (DE) ..................... 10 2021 206 653.4

(51) Int. Cl.

| | |
|---|---|
| ***B60W 10/188*** | (2012.01) |
| ***B60W 10/08*** | (2006.01) |
| ***B60W 30/18*** | (2012.01) |

(52) U.S. Cl.
CPC .......... *B60W 10/188* (2013.01); *B60W 10/08* (2013.01); *B60W 30/18127* (2013.01); *B60W 2710/081* (2013.01); *B60W 2710/083* (2013.01)

(58) Field of Classification Search
None
See application file for complete search history.

(56) References Cited

U.S. PATENT DOCUMENTS

2008/0093179 A1 4/2008 Jager et al.
2010/0025167 A1* 2/2010 Staub ..................... G16Z 99/00 188/156

(Continued)

FOREIGN PATENT DOCUMENTS

DE 102005059373 A1 6/2006
DE 102008023305 A1 11/2009

(Continued)

*Primary Examiner* — Navid Z. Mehdizadeh
*Assistant Examiner* — Jason R Roberson
(74) *Attorney, Agent, or Firm* — LEYDIG, VOIT & MAYER, LTD.

(57) ABSTRACT

A method for operating an electrified drivetrain for a work machine, including driving an electric motor of the drive-train being drivingly coupled to at least one wheel of the work machine, the work machine being subjected to a downhill force when traveling downhill, the downhill force bringing about an acceleration torque on the work machine. The method further includes counteracting the acceleration torque with a generator torque of the electric motor in generator mode, a maximum generator torque being dependent on an actual motor speed of the electric motor, and applying brakes in an automated manner when the work machine accelerates as a result of the downhill force. The brakes being applied reduces the actual motor speed until the maximum generator torque at a reduced actual motor speed is at least the same as the acceleration torque.

10 Claims, 2 Drawing Sheets

(56) References Cited

U.S. PATENT DOCUMENTS

| | | | | |
|---|---|---|---|---|
| 2010/0210409 | A1 | 8/2010 | Friesen et al. | |
| 2011/0192661 | A1 | 8/2011 | Hennings | |
| 2017/0129340 | A1 * | 5/2017 | Murthy | H02P 21/22 |
| 2023/0105135 | A1 * | 4/2023 | Glöckner | B60W 10/182<br>701/22 |

FOREIGN PATENT DOCUMENTS

| | | | |
|---|---|---|---|
| DE | 102008040812 | A1 | 2/2010 |
| DE | 102010008020 | A1 | 8/2011 |
| DE | 102015222016 | A1 | 5/2017 |
| DE | 102020201497 | A1 | 8/2021 |
| DE | 102020203594 | A1 | 9/2021 |
| EP | 0962597 | A2 | 12/1999 |
| WO | WO 2008128674 | A1 | 10/2008 |

* cited by examiner

METHOD FOR OPERATING AN ELECTRIFIED DRIVE TRAIN FOR A WORKING MACHINE, ELECTRIFIED DRIVE TRAIN FOR A WORKING MACHINE AND WORKING MACHINE

CROSS REFERENCE TO RELATED APPLICATIONS

This application is a U.S. National Phase application under 35 U.S.C. § 371 of International Application No. PCT/EP2022/067171, filed on Jun. 23, 2022, and claims benefit to German Patent Application No. DE 10 2021 206 653.4, filed on Jun. 28, 2021. The International Application was published in German on Jan. 5, 2023 as WO 2023/274836 A1 under PCT Article 21(2).

FIELD

The present invention relates to a method for operating an electrified drivetrain for a work machine, to an electrified drivetrain for a work machine, and to a corresponding work machine.

BACKGROUND

In the prior art, electrically driven work machines such as wheel loaders, skid loaders, telescopic handlers, dump trucks, and diggers are known. Work machines of this kind either are driven purely electrically, i.e., they only have either an electric battery or a fuel cell for generating electricity from hydrogen as an energy storage device, or they are driven on diesel-electricity power, which means that the required energy is provided by a diesel-powered generator and, where applicable, by an electrical buffer storage device, for example an accordingly dimensioned capacitor or a relatively small battery. In all cases, the mechanical power required for the traction drive and the work drive is furnished by one or more electric motors. It is also known to use the electric motors of electric drives in generator mode during braking operations in order to recover electrical power. In addition, a mechanical friction brake is always provided so that a large enough braking power can always be provided for safety reasons.

In this regard, EP 0962 597 A2 describes a battery-operated work machine that comprises two electric motors for the traction drive and a further electric motor for the work drive.

WO 2008/128674 A1 discloses a work machine having a hybrid drivetrain, comprising an internal combustion engine and an electric machine. To power the electric machine, an electrical energy storage device is provided, which can be regeneratively charged by operating the electric motor in generator mode during a braking operation of the work machine.

The as yet unpublished document DE 102020201497.3 by the applicant discloses a method for operating an electrified drivetrain for a work machine. Using means for identifying a slope in conjunction with means for detecting a forward movement of the work machine, the work machine traveling downhill can be identified. If the work machine exceeds a threshold speed while traveling downhill, the electric motor is placed in regenerative mode in order to prevent the work machine accelerating any further as a result of the downhill force.

In addition, the likewise as yet unpublished document DE 10 2020 203 594.6 by the applicant describes a method for operating an electrified drivetrain for a work machine. By means of an electric motor of the drivetrain being drivingly coupled to at least one wheel of the work machine, a braking torque generated by the electric motor in generator mode leads to a reduction in the speed of the at least one wheel. If, for example, the work machine inadvertently accelerates when traveling downhill despite the braking torque, the brakes are additionally applied in an automated manner.

However, the known electric drivetrains for work machines are disadvantageous in that when a work machine is traveling downhill at a relatively high speed, said drivetrains often can no longer apply a large enough regeneration torque, and thus a large enough braking torque, in order to prevent the work machine inadvertently accelerating further into an impermissibly high speed range for the work machine as a result of the downhill force. This insufficient regeneration torque is down to the fundamental behavior of electric motors, which, in their upper speed range and thus at high driving speeds of the work machine, only have a relatively low torque, which in turn allows for only a relatively small braking or regeneration torque. Thus, in a driving situation such as this, a service or parking brake has to be continually used in order to prevent the work machine inadvertently accelerating further while traveling downhill. However, since the service or parking brake is usually not configured to be actuated continuously or for a relatively long time, the brake system may be damaged if the service or parking brake is accordingly actuated for a long period of time.

SUMMARY

In an embodiment, the present disclosure provides a method for operating an electrified drivetrain for a work machine, comprising driving an electric motor of the drivetrain being drivingly coupled to at least one wheel of the work machine, the work machine being subjected to a downhill force when traveling downhill, the downhill force bringing about an acceleration torque on the work machine. The method further comprises counteracting the acceleration torque with a generator torque of the electric motor in generator mode, a maximum generator torque being dependent on an actual motor speed of the electric motor, and applying brakes in an automated manner when the work machine accelerates as a result of the downhill force. The brakes being applied reduces the actual motor speed until the maximum generator torque at a reduced actual motor speed is at least the same as the acceleration torque.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
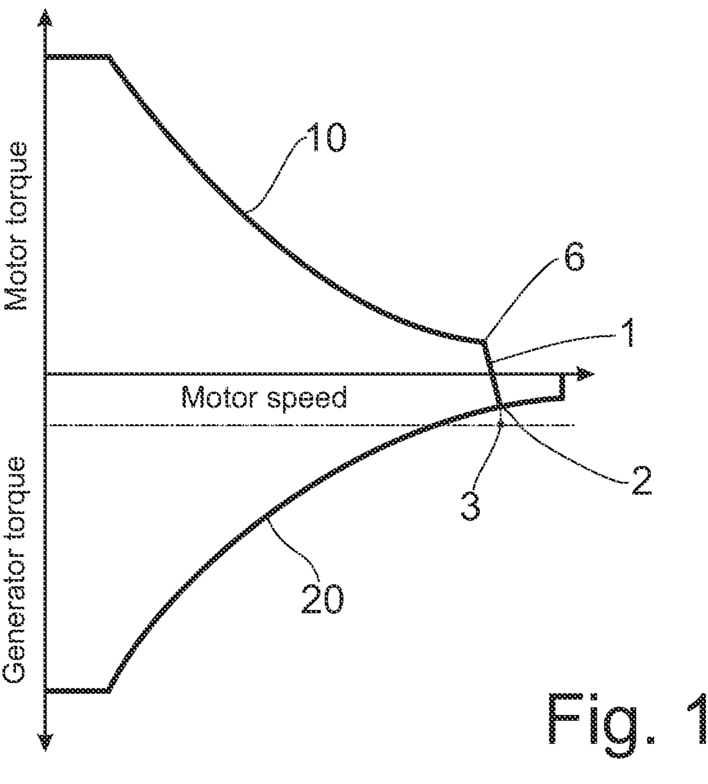
FIGS. 1 and 2 show, by way of example, a maximum motor torque and a maximum generator torque, in each case as a function of an actual motor speed of an electric motor, and FIG. 3 schematically shows, by way of example, an embodiment of a method according to the invention in the form of a flow chart.

In an embodiment, the present invention provides an improved method for operating an electrified drivetrain for a work machine.

An embodiment of the invention relates to a method for operating an electrified drivetrain for a work machine, an electric motor of the drivetrain being drivingly coupled to at least one wheel of the work machine, the work machine being subjected to a downhill force when traveling downhill, said downhill force bringing about an acceleration torque on the work machine, a generator torque of the electric motor in generator mode counteracting the acceleration torque, a maximum generator torque being dependent on an actual motor speed of the electric motor, and the brakes being applied in an automated manner when the work machine accelerates as a result of the downhill force. The method according to an embodiment of the invention is characterized in that the brakes being applied reduces the actual motor speed until the maximum generator torque at a reduced actual motor speed is at least the same as the acceleration torque.

An embodiment of the invention thus describes a method in accordance with which an electrified drivetrain can be operated. In this regard, the drivetrain is suitable for driving a work machine. Since work machines are generally operated under high drive loads most of the time and in particular also have to provide relatively high performance in absolute terms, the drivetrain according to an embodiment of the invention differs in terms of its set-up from, for example, passenger vehicle drivetrains, which are typically operated in a load range of 5% to 10% of the maximum power and in particular provide relatively low absolute performance.

An electric motor of the drivetrain is drivingly coupled to at least one wheel of the work machine, for example by means of a gearing or a releasable clutch, in particular by means of a multi-disk clutch. As a result of the driving coupling between the electric motor and the at least one wheel, an acceleration torque generated by the electric motor leads to the speed of the at least one wheel increasing and thus to the work machine accelerating. In this case, the increase in the speed of the at least one wheel corresponds to the increase in the speed of the electric motor in consideration of a transmission ratio between the electric motor and the at least one wheel. Conversely, an acceleration torque of the at least one wheel, which may result, for example, from the downhill force when the work machine is traveling downhill, also leads to an increase in the speed of the electric motor.

Preferably, the electric motor is drivingly coupled to all the wheels of the work machine.

In addition, the electric motor can be operated in generator mode in order to recover electrical power. In this operating mode, also known as regenerative mode, the electric motor converts kinetic energy of the work machine into electrical energy, which is supplied to a battery storage device in order to charge it.

This electrical energy can be drawn from the battery storage device again later if needed, in order to power the electric motor or other electric loads. In addition, the battery storage device may also be chargeable using external electrical energy by means of a charging cable or another suitable charging device, for example an induction charging device.

Using the electric motor for regeneration also reduces the wear on a mechanical friction brake since a generator torque acts as the braking torque during generator mode. In particular, the mechanical friction brake can consequently be configured in a relatively low-performance and more cost-effective manner and not for continuous operation.

However, a maximum generator torque that can be provided by the electric motor, and thus a maximum braking torque that can be provided by the electric motor, depends substantially on the relevant current motor speed, with the maximum generator torque decreasing as the motor speed increases. At high motor speeds, therefore, the electric motor can only apply a relatively small maximum generator torque. Conversely, at low motor speeds, the electric motor can apply a relatively large maximum generator torque.

To prevent the work machine accelerating more and more when traveling downhill owing to the generator torque, which decreases constantly as the motor speed increases, and, where applicable, to avoid a hazardous situation arising due to an excessive driving speed or to prevent the electric motor being damaged owing to an excessive motor speed, it is also provided that in this case the brakes are applied in an automated manner, in particular using the mechanical friction brake.

For this purpose, any inadvertent acceleration of the work machine is advantageously initially identified while the electric motor is in generator mode. In this regard, inadvertent acceleration should be construed as any acceleration that is not initiated by a driver of the work machine, as occurs due to downhill travel or the downhill force that has an accelerating effect on the work machine if the downhill force or the resulting acceleration torque exceeds the maximum generator torque that can be applied at the current motor speed.

Like any other acceleration of the work machine, the inadvertent acceleration can be identified on the basis of the monitoring and time-based differentiation of a detected wheel speed, motor speed, or other speed in a transmission of the work machine. It is also conceivable for the acceleration to be identified by means of a satellite navigation system, for example.

According to an embodiment of the invention, the brakes being applied then reduces the actual motor speed until such a point as the maximum generator torque at a reduced actual motor speed is at least the same as the acceleration torque. Thus, the brakes being applied counteracts the acceleration or the downhill force and assists the generator torque of the electric motor. In this case, the total of a braking torque of the brake application of the mechanical friction brake and the generator torque of the electric motor is greater than the acceleration torque, such that the work machine is slowed down when traveling downhill. Slowing the work machine down in turn leads to a reduction in the motor speed of the electric motor and thus to an increase in the maximum generator torque that can be applied. The maximum generator torque that can be applied increases more and more as the motor speed decreases.

This results in the advantage whereby the maximum generator torque, boosted by the application of the brakes, at the reduced actual motor speed is again large enough to compensate fully for the acceleration due to the downhill force, such that the work machine does not accelerate any further. Thus, the application of the brakes by the mechanical friction brake can be ended and the wear on the mechanical friction brake can be reduced. From then on, the speed of the work machine can be reliably controlled during downhill travel solely by the generator torque of the electric motor.

According to a preferred embodiment of the invention, the reduced actual motor speed is specified as a new target motor speed. In other words, first of all the actual motor speed of the electric motor is reduced by the application of the brakes until such a point as the maximum generator torque is large enough to prevent the work machine accelerating any further as a result of the downhill force. This reduced actual motor speed is then specified as the new target motor speed in a motor controller, for example an inverter of the electric motor, in order to prevent the work machine accelerating again and thus to prevent the generator torque being reduced during the downhill travel.

In particular, the driver of the work machine can also then no longer increase the target motor speed during downhill travel until the downhill travel has ended.

The end of the downhill travel can be identified, for example, by a tilt sensor.

According to a preferred embodiment of the invention, as the downhill force decreases, the reduced target motor speed is increased again up to the original target motor speed. Thus, the speed of the work machine is increased automatically again once the downhill travel has ended, until ultimately the target motor speed specified by the driver before the method according to an embodiment of the invention is carried out can be specified as the target motor speed again. The reduction in the actual motor speed and the target motor speed in order to increase the generator torque thus remains limited to the duration of the downhill travel.

According to a preferred embodiment of the invention, the target motor speed is increased if the maximum generator torque when an actual motor speed has been reached is greater than the acceleration torque by a predeterminable threshold value. In other words, the target motor speed thus can be increased again already before the end of the downhill travel if the maximum generator torque that can be provided is greater than the acceleration torque, for example owing to a reduction in the incline of the slope, by the predeterminable threshold value, which is an additional generator torque in the form of a safety buffer in case the incline of the slope and thus the downhill force increase briefly. In that case, owing in particular to the predeterminable threshold value acting as the safety buffer means, there is no need to worry about the work machine inadvertently accelerating further.

According to a preferred embodiment of the invention, the application of the brakes is intensified until such a point as the actual motor speed is reduced. This ensures that the application of the brakes brings about a strong enough braking torque to also actually lead to a reduction in the actual motor speed and thus to increase the generator torque.

According to a preferred embodiment of the invention, a required braking torque of the application of the brakes is ascertained on the basis of a generator torque characteristic curve. In this case, the generator torque characteristic curve shows a maximum generator torque that can be provided, as a function of the actual motor speed of the electric motor. Thus, the required braking torque of the application of the brakes can be ascertained in a simple manner on the basis of the current actual speed of the electric motor, which is preferably detected by means of a speed sensor, and on the basis of a change in the actual speed, corresponding to an acceleration of the work machine. The required braking torque is the difference between the total braking torque required and the maximum generator torque that can be provided.

According to a preferred embodiment of the invention, the application of the brakes is continually controlled. In other words, a braking torque brought about by the application of the brakes can be set or adjusted smoothly and thus in a manner largely optimally adapted to the necessary total braking torque required.

According to a preferred embodiment of the invention, the application of the brakes is ended if the maximum generator torque when an actual motor speed has been reached is greater than the acceleration torque. In this case, the use of the mechanical friction brake is no longer needed in order to generate an additional braking action. The work machine can then be prevented from accelerating further solely by the generator torque. Thus, the wear on the mechanical friction brake is also reduced.

An embodiment of the invention also relates to an electrified drivetrain for a work machine, comprising an electric motor, a control unit for controlling a motor speed of the electric motor, at least one driving wheel, and a hydraulically actuable and continually controllable mechanical friction brake. The electrified drivetrain according to an embodiment of the invention is characterized in that the drivetrain is configured for carrying out a method according to an embodiment of the invention.

The advantages described above in relation to methods according to embodiments of the invention are also produced for the drivetrain according to an embodiment of the invention.

The electrified drivetrain according to an embodiment of the invention comprises all the means and devices for carrying out the methods according to embodiments of the invention.

Lastly, an embodiment of the invention also relates to a work machine comprising a drivetrain according to an embodiment of the invention. The advantages described above in relation to the drivetrain according to an embodiment of the invention are also produced for the work machine according to an embodiment of the invention.

The work machine is preferably a wheel loader. However, it can also be a skid loader, a telescopic handler, a dump truck, a digger, or a tractor.

Identical objects, functional units, and similar components are denoted by the same reference numerals in all the figures. These objects, functional units, and similar components are configured identically in terms of their technical features unless otherwise indicated explicitly or implicitly in the description.

Figure 2:
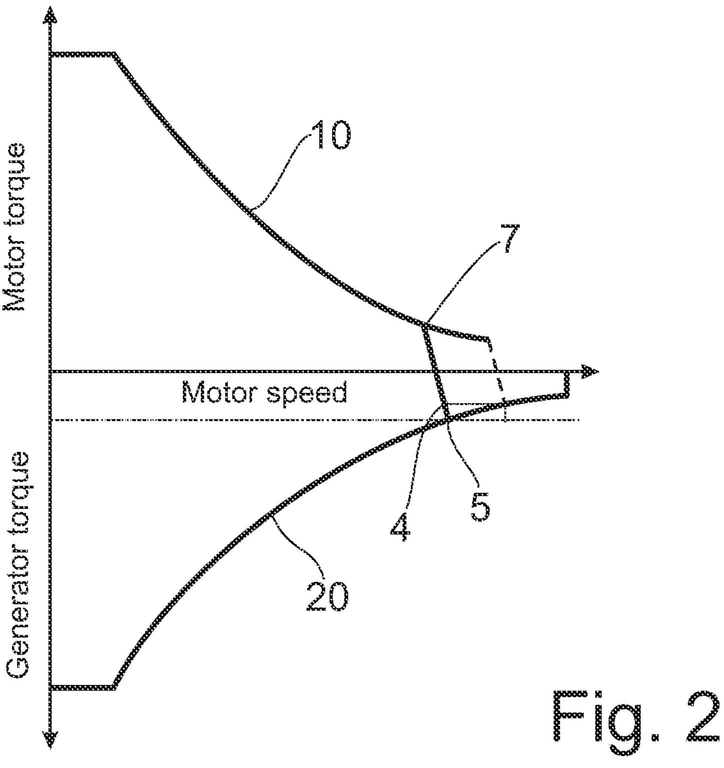

FIGS. 1 and 2 show, by way of example, a maximum motor torque 10 and a maximum generator torque 20, in each case as a function of an actual motor speed of an electric motor. As can be seen, the maximum motor torque 10 and the maximum generator torque 20 decrease as the actual motor speed increases, which represents typical behavior of electric motors.

The characteristic curve 10 shows the motor torque moment 10 plotted against the motor speed for a particular gas pedal position. The characteristic curve 20 shows the generator torque 20 in generator mode plotted against the motor speed. The dash-dot line depicts, by way of example, a necessary braking torque when driving on a particular downgrade. The gradient of the downgrade, the mass of the vehicle, and the rolling resistance of the vehicle tires are unknown in the example.

In this example, point 1 (FIG. 1) represents a driving status at a maximum speed of the work machine in the plane for a corresponding gas pedal position. The motor torque 10 is in equilibrium with the driving resistance.

If, according to the example, the work machine then drives onto a downgrade, the gradient of which generates a greater downhill force than can be compensated for by the maximum generator torque 20 at the current actual motor speed, the work machine will accelerate and the electric motor is at risk of being exposed to excessive speeds and thus damaged. The maximum generator torque 20 at the target motor speed is shown at point 2 (FIG. 1).

According to the example, the exceeding of a permitted maximum speed of the electric motor is identified when point 2 (FIG. 1) is passed.

A characteristic feature of electric drives is that the generator torque 20 decreases as the actual motor speed increases further, leading the work machine to accelerate ever more quickly.

To prevent the permitted maximum speed of the electric motor being exceeded, an additional braking torque or an additional braking torque is required. An equilibrium of forces between the acceleration torque resulting from the downhill force and the braking torque is indicated at point 3 (FIG. 1), and the permitted maximum speed is prevented from being exceeded here.

If the service or parking brake (configured as a mechanical friction brake in the example) is then actuated in a regulated manner when the permitted maximum speed of the electric motor is exceeded, the braking torque of said brake is added to the generator torque 20. The braking action is increased until such a point as the actual motor speed drops. The proportion of the braking action from the service or parking brake is higher than the actually required value by a proportion for slowing down the moving mass of the work machine.

The braking torque can be determined from the technical properties of the service or parking brake and the current actuation thereof. The torque component from the service or parking brake corresponds to the difference between the two points 2 and 3 (FIG. 1).

The generator characteristic curve 20 is known, and thus so too is the actual motor speed at which the generator torque corresponds to the value of point 5 (FIG. 2).

An electronic control unit (an inverter assigned to the electric motor in the example) then reduces the target motor speed at point 6 (FIG. 1) accordingly so that the maximum generator torque 20 reaches the value of point 5 (FIG. 2).

With the service or parking brake constantly actuated, the work machine is slowed down further. If the new target motor speed at point 7 is reached, the current generator torque 20 drops to the value of point 4 (FIG. 2). At this torque it is guaranteed that the maximum generator torque 20 is enough, without any additional braking action of the service or parking brake, to prevent the work machine inadvertently accelerating. The service or parking brake can then be deactivated in a regulated manner. In this case, the current generator torque 20 increases but remains below the speed-dependent maximum generator torque 20.

If the current generator torque 20 drops below a threshold value less than the maximum generator torque 20, the previously reduced target motor speed can be increased again until the original target motor speed is reached again. This ends the execution of the method.

Figure 3:
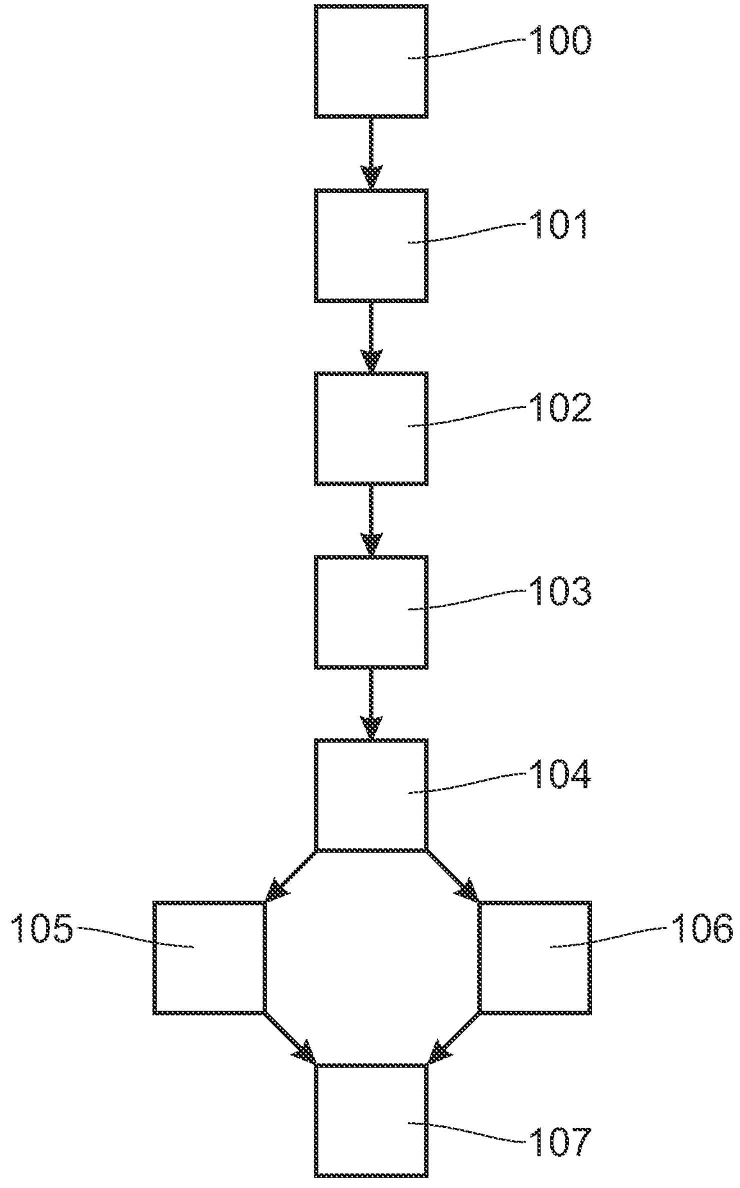

FIG. 3 schematically shows, by way of example, a possible embodiment of the method according to an embodiment of the invention in the form of a flow chart. The method is carried out in an electrified drivetrain for a work machine. The drivetrain comprises an electric motor, a control unit for controlling a motor speed of the electric motor, at least one driving wheel, and a hydraulically actuable and continually controllable mechanical friction brake. There is a driving coupling between the electric motor and at least one wheel of the work machine.

In a first method step 100, the work machine travels out of a plane onto an inclined surface and thus begins traveling downhill. Accordingly, it is subjected to a downhill force, which has an accelerating effect on the work machine in the form of an acceleration torque. Since the downhill force has an accelerating effect on the work machine and there is a driving coupling between the at least one wheel of the work machine and the electric motor, a generator torque of the electric motor in generator mode counteracts the downhill force and thus the acceleration of the work machine. In this case, the maximum generator torque 20 is dependent on an actual motor speed of the electric motor.

In the next step 101, it is established that the acceleration torque caused by the downhill force is greater than the maximum generator torque 20 that can be provided by the electric motor, and so the work machine is accelerated and the actual motor speed increases accordingly.

To prevent this inadvertent acceleration of the work machine, the brakes are applied in an automated manner in step 102. In step 103, the application of the brakes is continually intensified until such a point as the actual motor speed is reduced and the work machine is accordingly slowed down. In step 104, the application of the brakes is continued until such a point as the maximum generator torque 20 at a reduced actual motor speed is greater than the acceleration torque generated by the downhill force. When this is reached, i.e., when the maximum generator torque 20 that can be provided is greater than the acceleration torque, the reduced actual motor speed is specified as the new target speed in step 105. At the same time, the application of the brakes is ended in step 106.

When it is identified that the work machine is located in a plane again and no downhill force is acting on the work machine anymore, the original target motor speed from step 100 is specified as the new target motor speed again in step 107.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

10 Motor torque
20 Generator torque
100 Start of downhill travel
101 Established that the acceleration torque caused by the downhill force is greater than the maximum generator torque that can be provided by the electric motor
102 Brakes applied in an automated manner
103 Application of brakes continually intensified
104 Application of brakes continued until the maximum generator torque at a reduced actual motor speed is greater than the acceleration torque generated by the downhill force
105 Reduced actual motor speed specified as new target speed
106 Application of brakes ended
107 Original target motor speed specified as new target speed

The invention claimed is:

1. A method for operating an electrified drivetrain for a work machine, comprising:
driving an electric motor of the drivetrain being drivingly coupled to at least one wheel of the work machine, the work machine being subjected to a downhill force when traveling downhill, the downhill force bringing about an acceleration torque on the work machine;
counteracting the acceleration torque with a generator torque of the electric motor in generator mode, a maximum generator torque being dependent on an actual motor speed of the electric motor; and
applying brakes in an automated manner when the work machine accelerates as a result of the downhill force,
wherein the brakes being applied reduces the actual motor speed until the maximum generator torque at a reduced actual motor speed is greater than or equal to the acceleration torque.

2. The method according to claim 1, further comprising specifying the reduced actual motor speed as a new target motor speed for the generator mode.

3. The method according to claim 1,
wherein as the downhill force decreases, a reduced target motor speed is increased up to an original target motor speed.

4. The method according to claim 3,
wherein the target motor speed is increased based on the maximum generator torque being greater than the acceleration torque by a predeterminable threshold value and based on the reduced actual motor speed being reached.

5. The method according to claim 1,
wherein the application of the brakes is intensified until such a point as the actual motor speed is reduced.

6. The method according to claim 1,
wherein a required braking torque of the application of the brakes is ascertained on the basis of a generator torque characteristic curve.

7. The method according to claim 1,
wherein the application of the brakes is continually controlled.

8. The method according to claim 1,
wherein the application of the brakes is ended based on the maximum generator torque being greater than the acceleration torque and based on the reduced actual motor speed being reached.

9. An electrified drivetrain for a work machine, comprising:
an electric motor;
a control unit for controlling a motor speed of the electric motor;
at least one driving wheel; and
a hydraulically actuable and continually controllable friction brake,
wherein the drivetrain is configured to:
drive the electric motor, the electric motor being drivingly coupled to the at least one driving wheel of the work machine, the work machine being subjected to a downhill force when traveling downhill, the downhill force bringing about an acceleration torque on the work machine;
counteract the acceleration torque with a generator torque of the electric motor in generator mode, a maximum generator torque being dependent on an actual motor speed of the electric motor; and
apply brakes in an automated manner when the work machine accelerates as a result of the downhill force, wherein the brakes being applied reduces the actual motor speed until the maximum generator torque at a reduced actual motor speed is greater than or equal to the acceleration torque.

10. A work machine comprising the drivetrain according to claim 9.

* * * * *